(12) United States Patent
Vicard et al.

(10) Patent No.: US 7,047,402 B2
(45) Date of Patent: May 16, 2006

(54) PROCESS FOR BOOTING AND CAUSING COMPLETION OF SYNCHRONIZATION BASED ON MULTIPLE ACTUATIONS OF DESIGNATED KEY WHEN THE SYSTEM IS OFF

(75) Inventors: Dominique Vicard, Bernin (FR); Cecile Puyo, Bernin (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 501 days.

(21) Appl. No.: 10/143,744

(22) Filed: May 10, 2002

(65) Prior Publication Data

US 2002/0184542 A1    Dec. 5, 2002

(30) Foreign Application Priority Data

May 10, 2001   (EP)   ................................. 01410047

(51) Int. Cl.
*G06F 9/00* (2006.01)

(52) U.S. Cl. ........................... 713/1; 713/300; 713/375

(58) Field of Classification Search ................... 713/1, 713/300, 375
See application file for complete search history.

(56) References Cited

U.S. PATENT DOCUMENTS 5,027,274 A * 6/1991 Takayanagi ................. 250/584
5,777,505 A * 7/1998 LaRue ........................ 327/407
5,928,329 A   7/1999 Clark et al.
5,978,923 A * 11/1999 Kou ............................ 713/323
6,000,000 A * 12/1999 Hawkins et al. ............ 707/201
6,006,285 A * 12/1999 Jacobs et al. ................ 710/14
6,205,585 B1 * 3/2001 Bissett et al. ................ 714/49
6,272,629 B1 * 8/2001 Stewart ......................... 713/2
6,336,157 B1 * 1/2002 Carbonaro et al. .......... 710/59
6,364,697 B1 * 4/2002 Tseng et al. ................ 439/533
6,523,079 B1 * 2/2003 Kikinis et al. .............. 710/303
6,636,873 B1 * 10/2003 Carini et al. ................ 707/201
6,638,092 B1 * 10/2003 Groebe et al. .............. 439/341
6,763,473 B1 * 7/2004 Oteki et al. ................. 713/324

FOREIGN PATENT DOCUMENTS

EP           0 889 387 A2    1/1999

* cited by examiner

*Primary Examiner*—Lynne H. Browne
*Assistant Examiner*—Tse Chen

(57) ABSTRACT

A Computer based on a dual processing structure, with a main processing subsystem associated to an alternate processing subsystem. The main subsystem includes a main processor, a keyboard and a display, and the alternate processing subsystem has a quicker response time than the main processing subsystem. Additional multiplexing means are used for sharing said display and said keyboard between the two processing subsystems. The computer includes a powering control unit (40) for controlling the powering of the components of said main or said alternate processing subsystem, said powering control unit being controlled by a main power-on control and a alternate power-on control keys. The actuation on the main power-on control key causes the power-on control unit to power the two processors while actuating the alternate power-on control key causes the powering of the alternate processing subsystem only. There is also provided a process for controlling the powering on sequence of a computer having a main and an alternate subsystem.

4 Claims, 3 Drawing Sheets

PROCESS FOR BOOTING AND CAUSING COMPLETION OF SYNCHRONIZATION BASED ON MULTIPLE ACTUATIONS OF DESIGNATED KEY WHEN THE SYSTEM IS OFF

TECHNICAL FIELD OF THE INVENTION

The invention relates to booting procedures in relation to computers and more particularly, although not exclusively, to an improvement brought to the architecture of computers including a main processing subsystem involving a booting sequence which is not time-consuming in comparison with that of present architectures and hardware.

BACKGROUND ART

One of the issues that computers are facing is their inability to provide a real instant-on power feature. General purpose computers, and mobile computers in particular, present a limited capacity to provide an instantaneous response to a user's request. The power-on sequence of the computers—generally involving a boot-strap session followed by booting the operating system—substantially increases the time which is needed before the user becomes able to use his system.

In many situations, it is highly desirable that the computers be able to behave as any ordinary product would be, i.e. by responding whenever the user requests it. This is particularly true when considering the role and the importance of the computers which are now taken in the information era. With the development of the Internet network becoming the primary source of information for the public, more and more services are offered to the public in general, and web consumers in particular. In such a context, it is clear that the response time of the computers might be perceived by the web consumers as a clear obstacle against the generalization of their use in any field of human activity.

The limited reaction time of general purpose computers in general, and mobile computers in particular, limits both their ready acceptance and use by the public.

Some small machines, dedicated to mobile users, known in the field as pocket or palmtop computers may provide an instantaneous service to their users. However this kind of machine is dedicated to serve a specific kind of users, namely the business travelers. Further, these machine have a limited capacity and usually provide no keyboard, no real display and no hard disk drive.

It is therefore highly desirable to improve the possibilities of instantaneous response to the computer systems for the benefit of their users.

SUMMARY OF THE INVENTION

It is an object of the present invention to provide a new computer architecture which provides a substantially or perceived instantaneous response time to the users.

It is a further object of the present invention to process for controlling the powering sequence of a main and alternate subsystem included within a single computer, and sharing common Input/output devices.

This object is achieved by means of an architecture based on a dual processing structure, with a main processing subsystem involving a booting sequence and being associated with an alternate processing subsystem having a quicker response time. The main processing subsystem preferably comprises a main processor fitted with RAM storage and Input/output (I/O) devices, such as a hard-disk drive, a keyboard, a display and also communication means. The alternate subsystem may include a processor adapted to respond substantially instantaneously, such as that based on a pocket computer. The alternate processing subsystem may have its own I/O for allowing independent operating with respect to the main subsystem. Multiplexing circuits are preferably used for sharing the keyboard and the display between the two processing subsystems.

A powering and synchronization unit is preferably controlled by corresponding keys, preferably two in number, which allow simultaneous control of the mode of operation—main or alternate—as well as the control of the synchronization of the files within the system.

More particularly, a Main Power Control (MPC) key is preferably associated with an Alternate Power Control (APC) key for the purpose of direct control of the powering sequence of the two subsystems, as well as the synchronization of the files. When the user actuates the Main Power Control (MPC) key, the power-on unit causes the powering up of all the elements whereas, when the user actuates the Alternate Power Control (APC) key, only the alternate processing sub-system is powered up and able to receive keyboard input and communicate with the display via the multiplexing units.

By actuating an appropriate key, for example, either the MPC or the APC key, the user is given a user-friendly option by which he or she can decide and precisely control whether instantaneous service from the computer is needed., An example of such a situation might be initiating automatic access to the Internet. In the particular case of a mobile computer powered by a battery, the actuation of the APC key may cause an automatic shut-down of the main processor, in a manner which is transparent to the user. Further the switching to the alternative subsystem may significantly increase the life of the battery and this is a clear advantage for mobile users.

In one embodiment, the main processing subsystem may be fitted with an Operating System of the type WINDOWS 9x or WINDOWs 2000™ marketed by Microsoft Corp. and the alternate processing unit based on a pocket pc type processor equipped with WINDOWS CE™ type operating system.

Preferably, the Alternate Power Control (APC) key is used for automatically controlling the synchronization of the files respectively handled by the main and alternate processor so that the user may work with his files during a work session, whatever the particular format being considered.

The arrangement may be also adapted to provide substantially instantaneous access to web resources available on the Internet.

In one embodiment, the alternate processing means are embodied within an extractable or detachable autonomous system, such as a Portable Digital Assistant (P.D.A.) having its own power supply and a screen so that the user may easily remove and relocate the device.

The invention also provides a process for controlling the powering up of a computer comprising a main processing subsystem involving a booting sequence with an alternate processing subsystem which has a quicker response time. The computer also preferably includes shareable Input/Output devices whos assignment to said main or alternate subsystem is controlled by a first Main Power Control (MPC) key and a second Alternate Power Control (APC) key. The process preferably includes the steps of booting said main processing subsystem and assigning said I/O devices to said main subsystem upon actuation of said MPC key. Further, when the user actuates said APC key, the process instantaneously switches the I/O devices to the alternate subsystem.

When the user starts the booting sequence by actuating the MPC key, the powering up process includes the steps of powering up both main and alternate subsystems and then automatically synchronizing the main and the alternate subsystems. A work session can then be established with the main subsystem and the user is given an access to the full processing resources of the computer. The process then waits for an actuation of said MPC or APC key. Upon actuation of said APC key, the synchronization is completed and the I/O devices, particularly the keyboard and the display, are assigned to the alternate subsystem. The process then completes the power-off of the main subsystem while the user may continue to work with the alternate subsystem. Conversely, if the user actuates the MPC key, the synchronization is completed and is then followed by the power-off of both subsystems.

When the user starts the booting sequence by actuating the APC key, the process powers the alternate subsystem and the I/O devices are assigned to that alternate subsystem. The user is thus given instantaneous access to the keyboard and the display as well as the resources of the alternate computer and can therefore start a working session without further delay. The process then waits on an action from the user on one of the two MPC or APC keys. In response to the user actuating the APC key again, the process causes the synchronization of the files handled by the main and alternate subsystems and then completes the power-off sequence of both main and alternate subsystems. Conversely, should the user actuate the MPC key, the process causes the powering up of the main and alternate subsystems, followed by a synchronization of both systems. The user is then given access to the full processing resources of the computer.

Preferably, the alternate subsystem is an extractable or detachable subsystem and the process further involves the checking for the presence of said detachable subsystem.

DESCRIPTION OF THE DRAWINGS

An embodiment of the invention will now be described, by way of example only, with reference to the accompanying drawings, wherein.

DESCRIPTION OF A PREFERRED EMBODIMENT OF THE INVENTION

Figure 1:
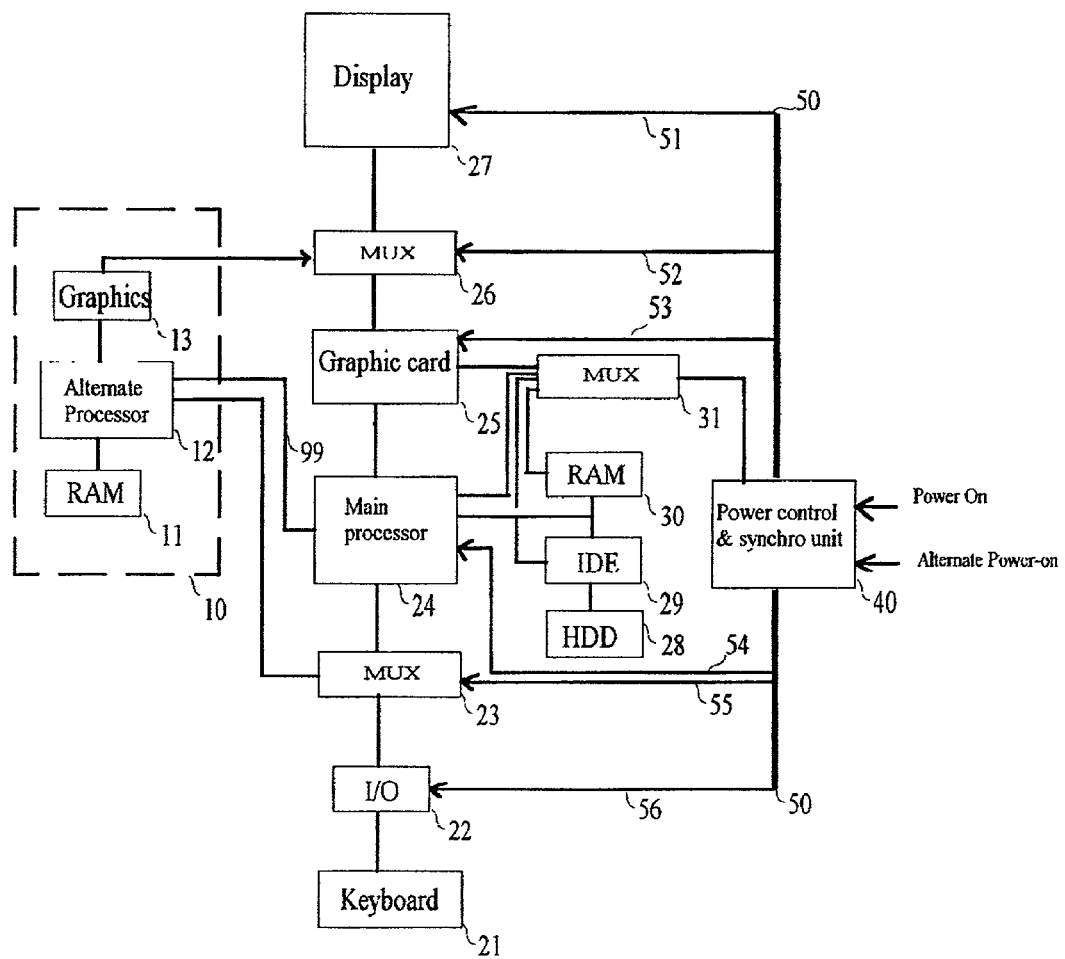
FIG. 1 illustrates the main architecture of a system based on a set of main and alternate processors.

FIG. 1 shows the basic architecture of a system comprising a main processing subsystem which is associated with an alternate processing subsystem 10.

Main processing subsystem is based on a main processor 24 operating with a graphic subsystem 25, RAM storage 30, a Hard Disk Drive (H.D.D.) unit 28 which the main processor 24 accesses via an appropriate interface, such as an IDE interface 29 for instance. Main processor 24 is any conventional microprocessor such as of the INTEL™ family operating under a LINUX or Windows™ type operating system.

In addition to the main processing subsystem, the computer further includes a second, or alternate, processing subsystem 10 based on an alternate processor 12 being equipped with its own RAM storage 11 and a graphic subsystem 13. Alternate processor 12 is a low power-consuming processor which, additionally, has instant-on feature capacity, that is to say adapted to operate with very little delay. Such a processor is known from the development of the pocket pc computers, such as the JORNADA™ which is marketed by the HP Corp. and which works under a WINDOWS CE™ type operating system.

Main processor 24 and alternate processor 12 are arranged to share a display 27 and an Input/output device 22 via, respectively, a first multiplexing unit 26 a second multiplexing unit 23 and a third multiplexing unit 31. The I/O device 22 is used for allowing attachment to a keyboard 21 and a pointing device or mouse device (not shown).

The main processing subsystem and the alternate processing subsystem communicate with each other via a serial data channel 99 which may be either of the type Universal Serial Bus (U.S.B) or any conventional serial link.

In the preferred embodiment, the alternate processing sub system is an detachable autonomous pocket computer having an additional smaller display. This is used when the subsystem is extracted from the computer which acts as a docking station. When the autonomous sub-system is embedded in or attached to the computer, the alternate processor 12 is used in association with the main display.

The system is fitted with a specially designed Power Control and Synchronization (PCS) unit 40 which provides power circuitry for the different elements of the computer attached to a power bus 50. Power bus 50 particularly includes power circuits 51, 52, 53, 54, 55 and 56 which respectively power display 27, multiplexor 26, the graphic system 25 of the main sub-system, the main processor 24, the multiplexor 23 and the I/O devices 22. PCS unit 40 is controlled by means of a dual set of power-on control keys, namely a Main Power Control (MPC) and an Alternate Power-on Control (APC) key.

In the preferred embodiment, the actuation by the user of the MPC key causes the simultaneous powering up of the two processing subsystems. This is achieved by the activation of all the different circuits of the bus 50. In that situation, the multiplexors 23, 26 and 31 are controlled so that the display 27 and the keyboard 21 are both assigned to the main processor 24 which may immediately start its booting sequence. The user will then be able to access the high-level processing resources which are available in the system, as in any conventional personal computer.

When the user actuates the Alternate Power Control (APC) key, the Power Control and Synchronization (PCS) unit 40 activates circuits 51, 52, 55 and 56; and further deactivates leads 53 and 54 powering the main processing subsystem. Correspondingly, the multiplexors 23, 26 and 31 are controlled by the unit 40 for the purpose of assigning the display 27 and the keyboard 21 to the alternate processing subsystem. In the preferred embodiment, the computer is a mobile computer and the battery is then devoted to powering the processing subsystem 10. The battery life is thus substantially increased since the high power-consuming main processing subsystem is deactivated.

In a preferred embodiment, actuating the Alternate Power Control (APC) key further causes the synchronization between the two processors. This is achieved by means of a data path 99 which is, for instance, a Universal Serial Bus (USB), a serial link or any other conventional bus. The particular procedure which is used for achieving the synchronization between the two subsystems is well known in the art of computers, and can be, for instance, of the type ACTIVE SYNC known in the WINDOWS™ operating system.

With respect to FIGS. 2 and 3 there will now be discussed the detail of the enhanced powering-up sequence of the whole system as well as the synchronization process between the two processors for the purpose of illustrating how easily a user can control the booting sequence and decide whether he or she will obtain an instantaneous response from his computer.

The process starts in step 200 where the process determines whether the user actuates the MPC or APC key. FIG. 2 more particularly illustrates the process which is executed in response to the actuation of the MPC key when the whole system is off. FIG. 3 illustrates the flow chart which is executed when the APC key is actuated by the user with the whole system being off.

Step 201 is an optional step which is useful when the Alternate subsystem is a detachable separate unit, such as a pocket pc. In step 201, a test is carried out to determine whether the subsystem 10 is present within the computer. Conventional techniques for determining the presence of such a system may be used and will not be discussed in detail. If the test reveals that only the main processor 24 is present, the process then proceeds to step 202 where Power Control and Synchronization (PCS) unit 40 controls the powering up of main processor 24 only. Conversely, if the test of step 201 reveals that the alternate subsystem is present, then the two processing subsystems are powered up in step 203. This is achieved by controlling the different power circuits of bus 50. From that instant, the main processor starts the usual booting sequence. When the operating system is launched, synchronization of the files is executed in a step 204 between the two subprocessing units. This operation, which is automatically carried out, ensures that the user will work with the most recently updated version of his own files.

At step 205, while the user may use his computer and work on his files, the process waits for an input from the user on one of the two MPC or APC keys. If the user actuates the APC key, then the process proceeds to step 206 where the synchronization process between the two processing sub-units is completed. The process proceeds then to a step 207 where the powering unit 40 controls the switching of the display 27 and the keyboard 21 to the alternate processing sub-system 10. This is achieved, again, by means of the appropriate multiplexors 23, 26 and 31. At step 208, the powering unit causes the power-off of the main processor 24 associated with its own components, i.e. the graphic subsystem 25, RAM and HDD storage. In one embodiment, an additional actuation on the APC key causes the process to instantaneously shut down the alternate subsystem 10.

In the case where the user actuates the MPC key in step 205, the process then proceeds to a step 209 where the synchronization process between the two processing subsystems is executed. The process can then control the powering unit 40 for the purpose of switching off all the elements of the computers at step 210.

Figure 3:
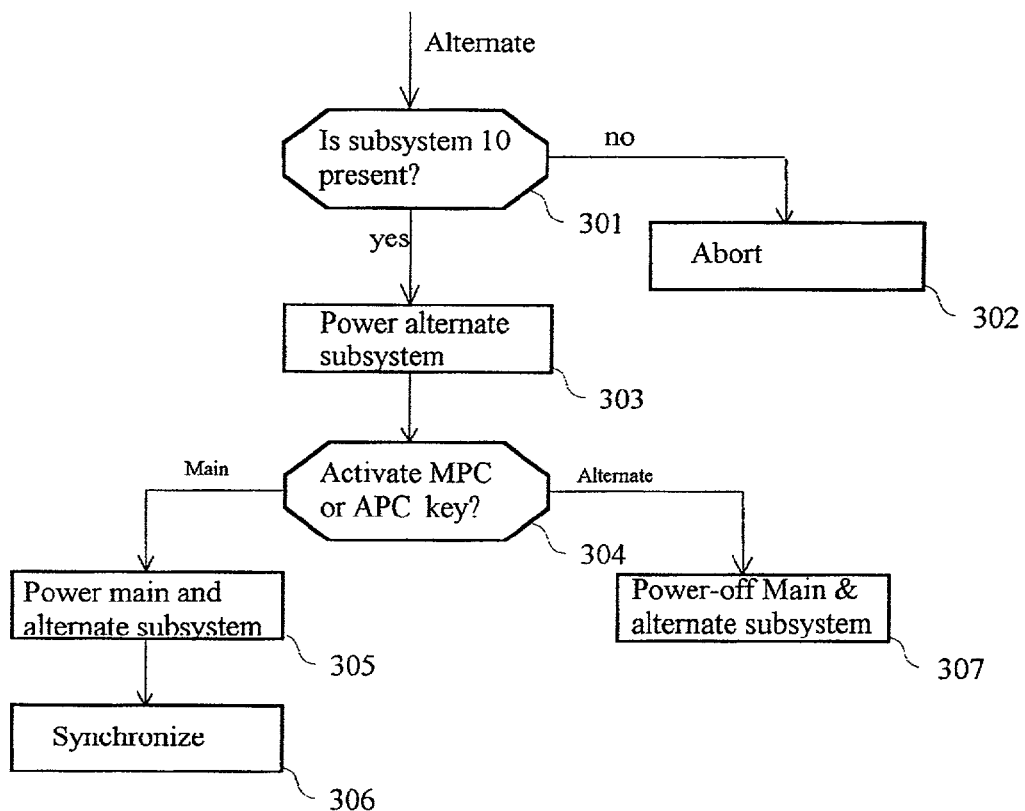

FIG. 3 particularly illustrates the process which is executed when the machine is fully switched off and if the user actuates the Alternate Power Control (APC) key.

Figure 2:
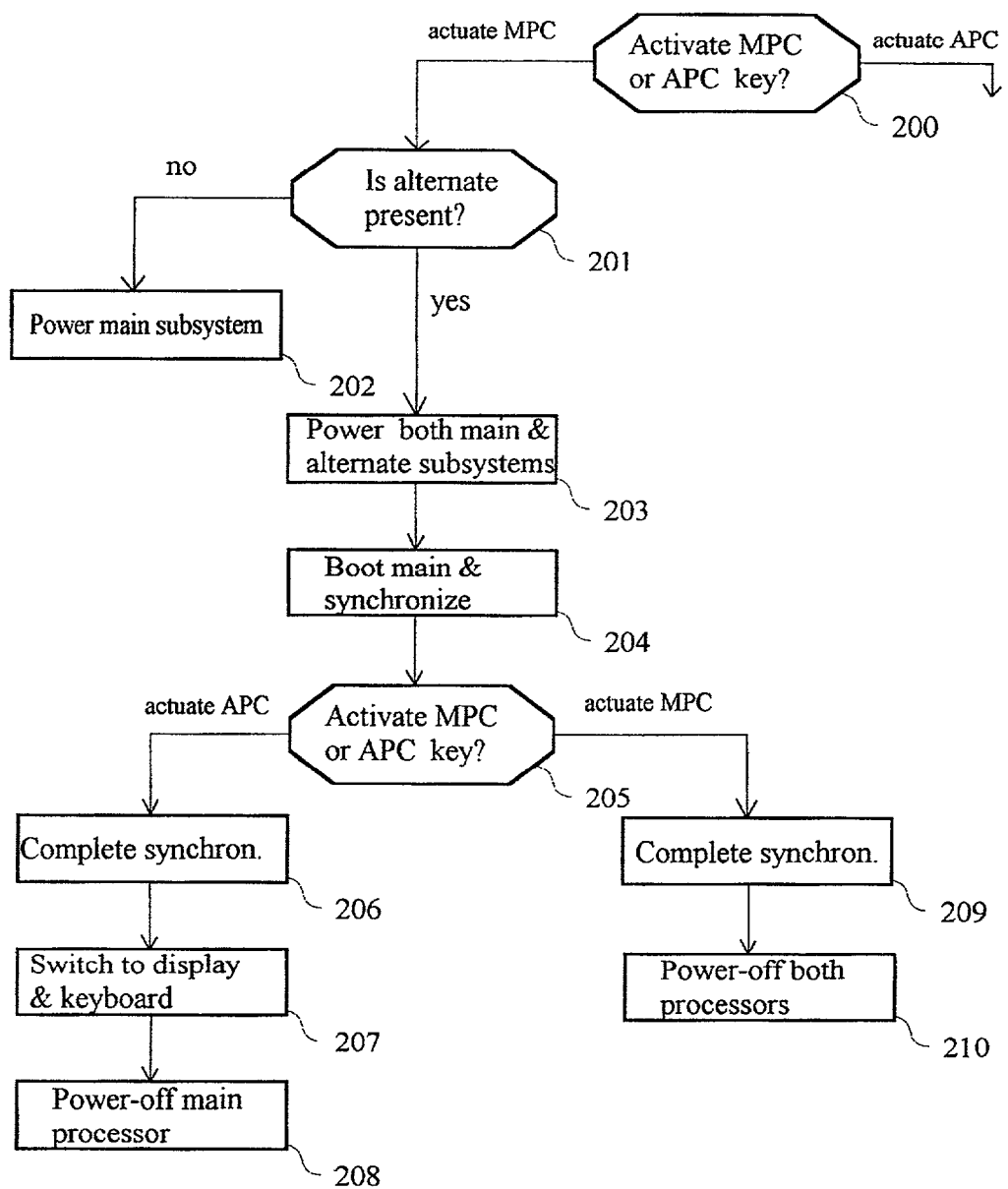
FIGS. 2 and 3 are flow charts illustrating the control of an exemplary powering up and synchronization process by one unique control key.

Step 301 is an optional test which is similar to the test of step 201 in FIG. 2. In step 301, a test is performed to determine whether the subsystem 10 is present within the computer. If the test shows that only the main processor 24 is present, then the process aborts in a step 302. Conversely, if the test of step 301 reveals that the alternate subsystem is present, then the Power Control and Synchronization (PCS) unit 40 controls the powering of the only alternate subsystem 10 in a step 303 and further controls the multiplexing circuits 23, 26 and 31 for the purpose of assigning the keyboard 21, the display 27 and the mouse to the alternate subsystem 10. This particularly involves the control of the different powering circuits of bus 50. From that point, the computer can instantaneously start with the alternate processor 12 in a working session, for example accessing the Internet. During the working session, the process then enters in step 304 in a test for the purpose of detecting a particular action from the user on one of the two MPC or APC keys. If the user actuates the MPC key, then the process proceeds to a step 305 where the Power Control and Synchronization (PCS) unit 40 causes the powering of the two processors 12 and 24 with their associated components. The main operating system can then be launched and, in a further step 306, the process then automatically controls the synchronization of the files between the two processing sub-system so as to ensure an update of the user's documents within the computer. This ensures that the user will work with the updated version of his files, whatever the particular system is selected by an action on either the MPC or the APC keys.

If the user actuates APC key in step 304, then the process proceeds to a step 307, where the process completes the power-off of the two systems.

Although the invention has been described by way of example and with reference to particular embodiments it is to be understood that modification and/or improvements may be made without departing from the scope of the appended claims.

Where in the foregoing description reference has been made to integers or elements having known equivalents, then such equivalents are herein incorporated as if individually set forth.

The invention claimed is:

1. A process for controlling powering up a computer comprising a main processing subsystem involving a booting sequence with an alternate processing subsystem having quicker response time; said computer further comprising sharable Input/Output devices which assignment to said main or alternate processing subsystem is controlled by a first Main Power Control (MPC) key and a second Alternate Power Control (APC) key, said process comprising:
    booting said main processing subsystem and assigning said I/O devices to said main processing subsystem upon actuation on said MPC key, wherein an actuation of said MPC key, when the system is off, comprises:
    powering up both main and alternate processing subsystems;
    automatically synchronizing said main and alternate processing subsystems;
    initiating a work session and waiting for an actuation on said MPC or APC key;
    in response to the user actuating said APC key, causing the completion of said synchronization, then the switching of said I/O devices to said alternate processing subsystem, then followed by the power-off of said main processing subsystem; and
    in response to the user actuating said MPC key, causing the completion of said synchronization, then followed by the power-off of said main and said alternate processing subsystems; and
    substantially instantaneously switching said I/O devices to said alternate processing subsystem upon actuation of said APC key.

2. A process according to claim 1 further comprising:
    determining whether said alternate processing subsystem is present within said computer.

3. A process according to claim 1 wherein actuation of said APC key when the system is off comprises:
    powering said alternate processing subsystem and initiating a work session with said alternate processing subsystem being assigned said I/O devices;
    waiting for an actuation on said MPC or APC key;
    in response to the user actuating said APC key, causing the synchronization of the files handled by said main and alternate processing subsystems then followed by the power-off of main and alternate processing systems; and
    in response to the user actuating said MPC key, causing the powering on of said main and alternate processing subsystem, then followed by a synchronization of both processing subsystems.

4. Process according to claim 3, further comprising a test for checking whether said alternate processing subsystem is present within said computer.

* * * * *